United States Patent
Telford et al.

(10) Patent No.: US 7,332,142 B2
(45) Date of Patent: Feb. 19, 2008

(54) METHOD AND APPARATUS FOR BUBBLE INJECTION OF AGENT INTO EXHAUST GAS FOR USE WITH EMISSION ABATEMENT DEVICE

(75) Inventors: Clive D. Telford, Lancaster (GB); Helmut Venghaus, Ingolstadt (DE); Lee Watts, Gerstofen (DE); Andreas Mayr, Meitingen (DE); Marco Ranalli, Augsburg (DE); Peter Kroner, Augsburg (DE); David Herranz, Pamplona (ES); Gregg Speer, Dachau (DE); Stefan Schmidt, Langweid/Lech (DE); A. Steven Walleck, Lakewood, OH (US)

(73) Assignee: EMCON Tehnologies Germany (Augsburg) GmbH (DE)

( * ) Notice: Subject to any disclaimer, the term of this patent is extended or adjusted under 35 U.S.C. 154(b) by 410 days.

(21) Appl. No.: 11/155,977

(22) Filed: Jun. 17, 2005

(65) Prior Publication Data

US 2007/0022743 A1    Feb. 1, 2007

(51) Int. Cl.
  B01D 53/34  (2006.01)
  B01D 53/56  (2006.01)
  B01D 53/92  (2006.01)
  B01J 19/00  (2006.01)
  F01N 3/00   (2006.01)

(52) U.S. Cl. ........... 423/210; 423/213.2; 423/215.5; 423/235; 423/239.1; 422/105; 422/107; 422/168; 422/177; 422/178; 422/183; 60/274; 60/282; 60/299

(58) Field of Classification Search ........ 423/210, 423/213.2, 235, 239.1, 215.5; 422/105, 107, 422/168, 177, 178, 183; 60/274, 282, 299
See application file for complete search history.

(56) References Cited

U.S. PATENT DOCUMENTS

| 4,270,936 A | 6/1981 | Mann |
| 4,276,066 A | 6/1981 | Bly et al. |
| 4,281,512 A | 8/1981 | Mills |
| 4,319,896 A | 3/1982 | Sweeney |
| 4,335,574 A | 6/1982 | Sato et al. |
| 4,373,330 A | 2/1983 | Stark |
| 4,381,643 A | 5/1983 | Stark |
| 4,481,767 A | 11/1984 | Stark |

(Continued)

FOREIGN PATENT DOCUMENTS

GB    2 134 407 A    8/1984

OTHER PUBLICATIONS

Tyson, Jeff, "How Inkjet Printers Work", howstuffworks.com., pp. 1-12, (2004).

(Continued)

*Primary Examiner*—Timothy C. Vanoy
(74) *Attorney, Agent, or Firm*—Barnes & Thornburg LLP

(57) ABSTRACT

An apparatus comprises an exhaust system and an injection system. The injection system is configured to vaporize a first liquid portion of an agent into at least one bubble so as to inject a second liquid portion of the agent into the exhaust system by use of the at least one bubble for delivery of the agent to an emission abatement device of the exhaust system. An associated method is disclosed.

20 Claims, 3 Drawing Sheets

U.S. PATENT DOCUMENTS

| | | | |
|---|---|---|---|
| 4,520,624 A | 6/1985 | Kiyota et al. | |
| 4,532,530 A | 7/1985 | Hawkins | |
| 4,573,317 A | 3/1986 | Ludecke | |
| 4,651,524 A | 3/1987 | Brighton | |
| 4,730,455 A | 3/1988 | Pischinger et al. | |
| 4,840,028 A | 6/1989 | Kusuda et al. | |
| 4,848,083 A | 7/1989 | Goerlich | |
| 4,849,774 A | 7/1989 | Endo et al. | |
| 4,851,015 A | 7/1989 | Wagner et al. | |
| 4,902,487 A | 2/1990 | Cooper et al. | |
| 5,024,054 A | 6/1991 | Barris et al. | |
| 5,048,287 A | 9/1991 | Howe et al. | |
| 5,063,396 A | 11/1991 | Shiokawa et al. | |
| 5,063,737 A | 11/1991 | Lopez-Crevillen et al. | |
| 5,065,574 A | 11/1991 | Bailey | |
| 5,094,075 A | 3/1992 | Berendes | |
| 5,140,814 A | 8/1992 | Kreutmair et al. | |
| 5,201,802 A | 4/1993 | Hirota et al. | |
| 5,211,009 A | 5/1993 | Houben et al. | |
| 5,251,564 A | 10/1993 | Rim et al. | |
| 5,365,733 A | 11/1994 | Takeshima et al. | |
| 5,447,696 A | 9/1995 | Harada | |
| 5,511,413 A | 4/1996 | Pfister et al. | |
| 5,646,660 A | 7/1997 | Murray | |
| 5,656,048 A | 8/1997 | Smith et al. | |
| 5,685,145 A | 11/1997 | Sung et al. | |
| 5,711,149 A | 1/1998 | Araki | |
| 5,934,069 A | 8/1999 | Hertl et al. | |
| 5,946,906 A | 9/1999 | Akazaki et al. | |
| 5,983,628 A | 11/1999 | Borroni-Bird et al. | |
| 6,012,284 A | 1/2000 | Tanaka et al. | |
| 6,063,150 A | 5/2000 | Peter et al. | |
| 6,182,445 B1 | 2/2001 | Yamazaki et al. | |
| 6,233,926 B1 | 5/2001 | Bailey et al. | |
| 6,314,722 B1 | 11/2001 | Matros et al. | |
| 6,318,077 B1 | 11/2001 | Claypole et al. | |
| 6,321,533 B1 | 11/2001 | Watanabe et al. | |
| 6,327,852 B1 | 12/2001 | Hirose | |
| 6,334,306 B1 | 1/2002 | Mori et al. | |
| 6,347,511 B1 | 2/2002 | Haines | |
| 6,357,226 B2 | 3/2002 | Borland | |
| 6,422,006 B2 | 7/2002 | Ohmori et al. | |
| 6,427,436 B1 | 8/2002 | Allansson et al. | |
| 6,446,430 B1 | 9/2002 | Roth et al. | |
| 6,464,744 B2 | 10/2002 | Cutler et al. | |
| 6,568,179 B2 | 5/2003 | Deeba | |
| 6,571,551 B2 | 6/2003 | Lundgren et al. | |
| 6,641,944 B2 | 11/2003 | Kawasumi et al. | |
| 6,694,727 B1 | 2/2004 | Crawley et al. | |
| 6,871,489 B2 | 3/2005 | Tumati et al. | |
| 2002/0155331 A1 | 10/2002 | Kamegaya et al. | |
| 2003/0138688 A1 | 7/2003 | Hattori et al. | |
| 2004/0052693 A1 | 3/2004 | Crane, Jr. et al. | |
| 2005/0106081 A1* | 5/2005 | Lin | 422/171 |

OTHER PUBLICATIONS

Donaldson Company brochure, "Emission Control Technologies", pp. 1-8 (Mar. 2005).

* cited by examiner

METHOD AND APPARATUS FOR BUBBLE INJECTION OF AGENT INTO EXHAUST GAS FOR USE WITH EMISSION ABATEMENT DEVICE

FIELD OF THE DISCLOSURE

The present disclosure relates generally to methods and apparatus for treatment of emissions present in exhaust gas.

BACKGROUND OF THE DISCLOSURE

Emission abatement devices are used to treat emissions present in exhaust gas. For example, there are NOx traps, particulate filters, and selective catalytic reduction (SCR) devices. From time to time, NOx traps and particulate filters may need to be "regenerated" to purge them of emissions trapped thereby. A regenerative agent may be injected into the exhaust gas to facilitate such regeneration. In addition, there are SCR devices which operate in conjunction with an agent injected into the exhaust gas stream to facilitate removal of NOx therefrom. This application relates to enhancements in the injection of regenerative agents and other agents into the exhaust gas for use with emission abatement devices.

SUMMARY OF THE DISCLOSURE

According to a first aspect of the present disclosure, there is provided an apparatus having an exhaust system and an injection system. The injection system is configured to vaporize a first liquid portion of an agent into at least one bubble so as to inject a second liquid portion of the agent into the exhaust system by use of the at least one bubble for delivery of the agent to an emission abatement device of the exhaust system. In an implementation, a heater is used to vaporize the first liquid portion into the at least one bubble. An associated method is disclosed.

The above and other features of the present disclosure will become apparent from the following description and the attached drawings.

DETAILED DESCRIPTION OF THE DRAWINGS

Figure 1:
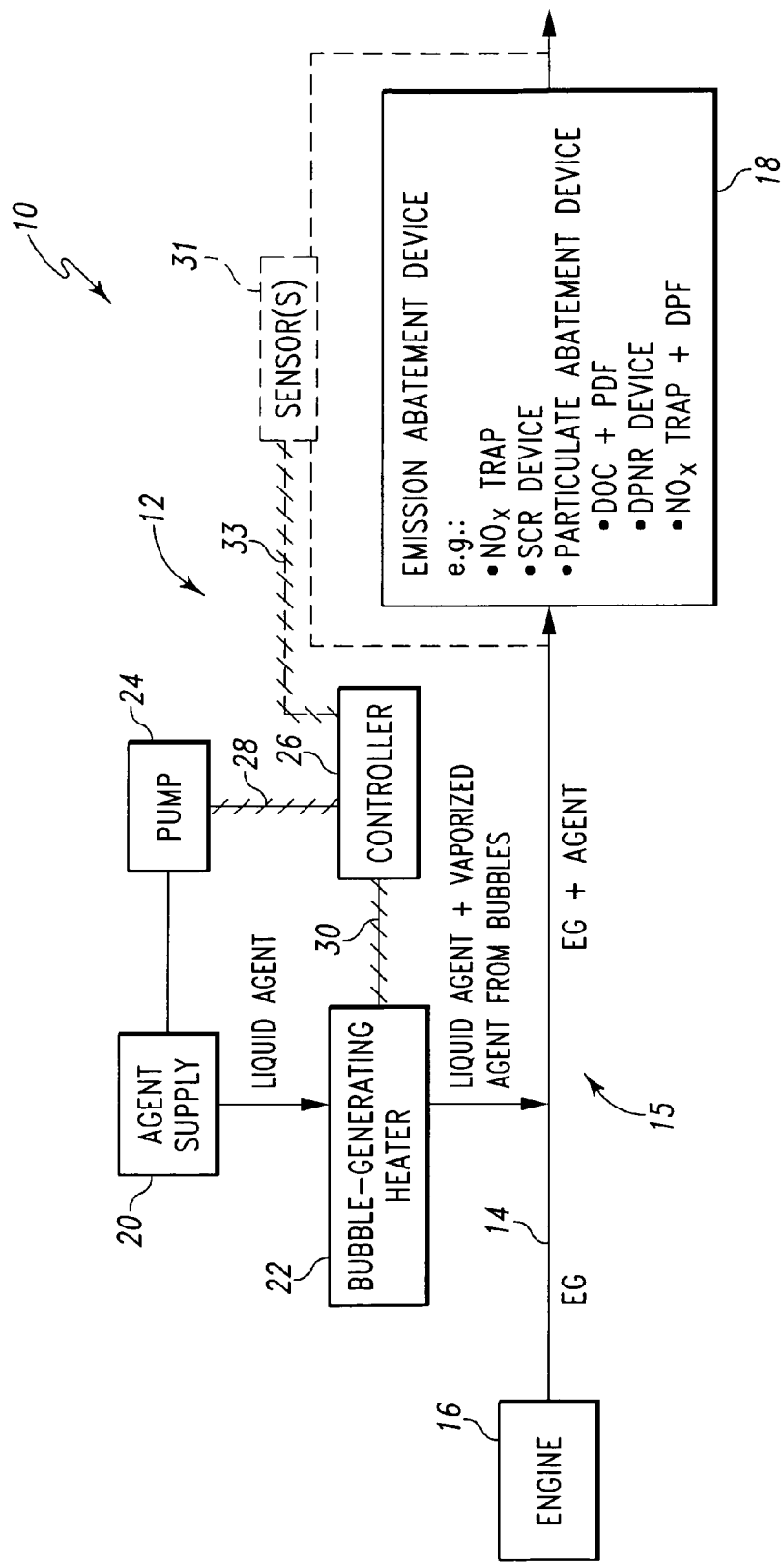
FIG. 1 is a simplified block diagram showing an apparatus that employs bubble-injection of an agent into an exhaust gas stream for use with an emission abatement device.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Referring to FIG. 1, there is shown an apparatus 10 including an injection system 12 configured to inject an agent into a stream of exhaust gas ("EG") flowing through an exhaust line 14 of an exhaust system 15 extending between an internal combustion engine 16 (e.g., a diesel engine) and an emission abatement device 18 of the exhaust system 15. The injection system 12 does so by vaporizing into at least one bubble only a first liquid portion of the agent supplied in liquid form by an agent supply 20. Such bubble generation provides the necessary injection force for injecting and atomizing a non-vaporized, second liquid portion of the agent into the exhaust gas stream. Once injected into the exhaust gas, a portion or all of the bubble-injected agent may or may not change phase (e.g., liquid to vapor, vapor to liquid) depending on such factors as the temperature of the exhaust gas stream. The bubble-injected agent is then advanced through the exhaust line 14 to the emission abatement device 18 for use therewith as discussed in more detail below.

Such an arrangement reduces power consumption and "thermal lag" while promoting mixing of the agent in the exhaust gas stream without the use of supplemental air. In particular, since all of the liquid agent supplied by the agent supply 18 is not vaporized by the system 12, both power consumption and thermal lag in heating the liquid agent to vaporization are reduced. Reduction of thermal lag is particularly useful during transient conditions. In addition, generation of bubbles promotes atomization of the liquid agent into small droplets, thereby promoting mixing of the agent in the exhaust gas stream. Further, since generation of the bubbles from the liquid agent provides sufficient atomization and sufficient force for injecting the agent, there is no need to use supplemental air to assist with agent atomization and injection.

The injection system 12 includes a heater 22 for vaporizing only a portion of the liquid agent. A pump 24 under the control of a controller 26 via an electrical line 28 causes liquid agent from the agent supply 20 to flow to the heater 22. The controller 26 operates the heater 22 via an electrical line 30 to heat and vaporize the portion of the liquid agent into bubbles to provide atomization and injection of the remaining non-vaporized, liquid portion of the agent. As such, the agent is injected into the exhaust gas stream as atomized liquid agent droplets and as vaporized agent from the bubbles.

The controller 26 may control operation of the heater 22 according to a variety of schemes. For example, the controller 26 may control operation of the heater 22 according to a time-base scheme or a sensor-based scheme. In the case of a time-based scheme, the controller 26 may operate the heater 22 for a predetermined period of time and cease operation of the heater 22 for a predetermined period of time, the length of the time periods depending on such factors as the type of emission abatement device to receive the injected agent.

In the case of a sensor-based scheme, the injection system 12 includes one or more sensors 31 for sensing one or more parameters associated with the exhaust gas stream. Each sensor 31 is electrically coupled to the controller 26 via an electrical line 33 to provide information indicative of the sensed parameter to the controller 26. For example, the sensor(s) 31 may include a NOx sensor upstream and/or downstream from the emission abatement device 18. This may be particularly useful when the emission abatement device 18 includes a NOx trap, an SCR device, and/or other NOx abatement device. In other examples, the sensor(s) 31 may include one or more pressure sensors to detect a pressure drop across the emission abatement device 18 or other pressure(s) upstream and/or downstream from the emission abatement device 18. This may be particularly useful when the emission abatement device 18 includes a particulate abatement device and/or a NOx trap.

Figure 2:
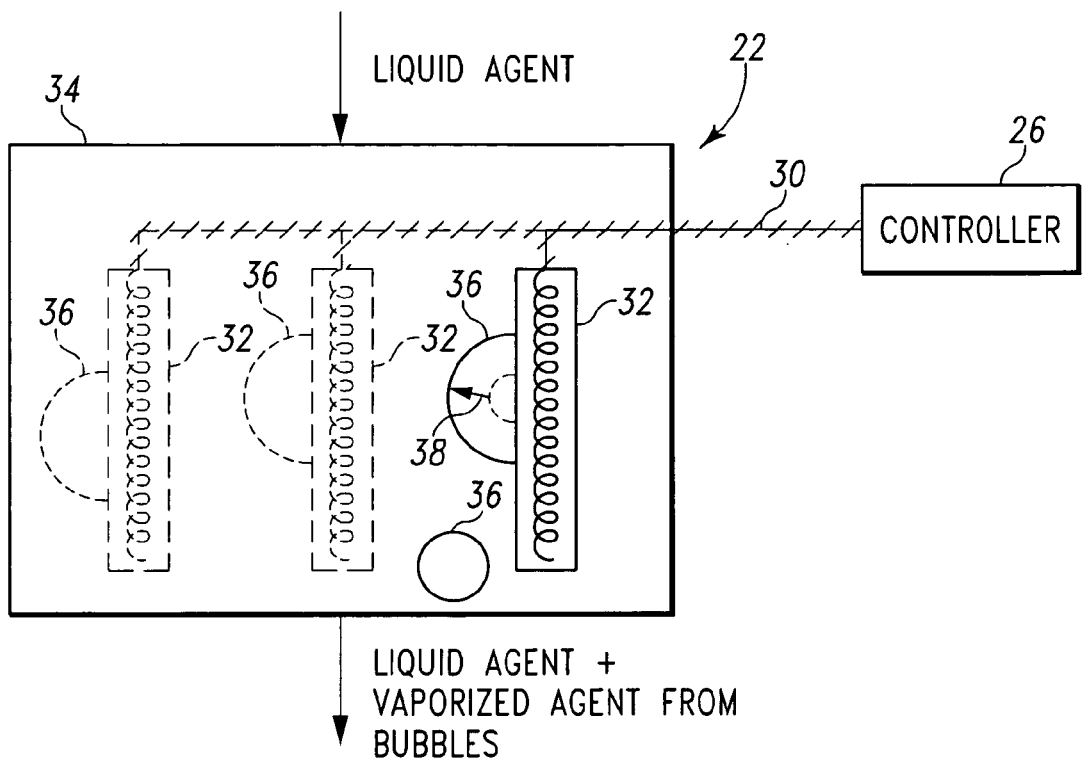
FIG. 2 is an enlarged diagrammatic view of a bubble-generating heater.

Referring to FIG. 2, the heater 22 includes at least one electrically powered heating element 32 mounted in a housing 34 and coupled to the controller 26 via the electrical line 30. The heating element 32 provides the heat for vaporizing the portion of the liquid agent into the bubbles (which are indicated by reference number 36 in FIGS. 2-4) when the heating element 32 is activated by controller 26. The bubbles form on the heating element 32. Expansion of the bubbles to a larger size (indicated by arrow 38 in FIG. 2) pushes the liquid agent along for injection into the exhaust gas stream. Detachment of the bubbles from the heating element 32 promotes atomization of the liquid agent. The heater 22 may have only one heating element 32 to promote power reduction or may have a plurality of heating elements 32 to promote bubble generation.

Figure 3:
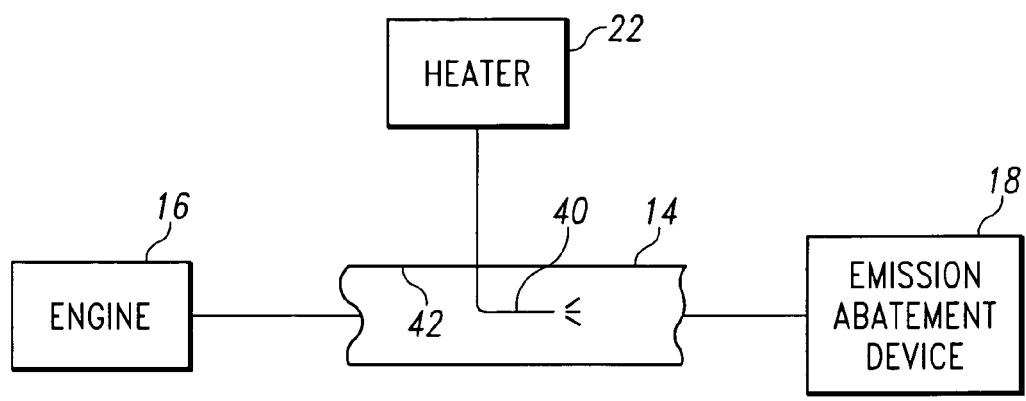
FIG. 3 is a diagrammatic view showing the heater separated from a fuel-injection nozzle.

Referring to FIG. 3, the heater 22 is provided separate from a nozzle 40 for injecting the liquid and vaporized agent into the exhaust line 14. Illustratively, the heater 22 is located outside of an exhaust gas passageway 42 of exhaust line 14 and nozzle 40 is located in the passageway 42.

Figure 4:
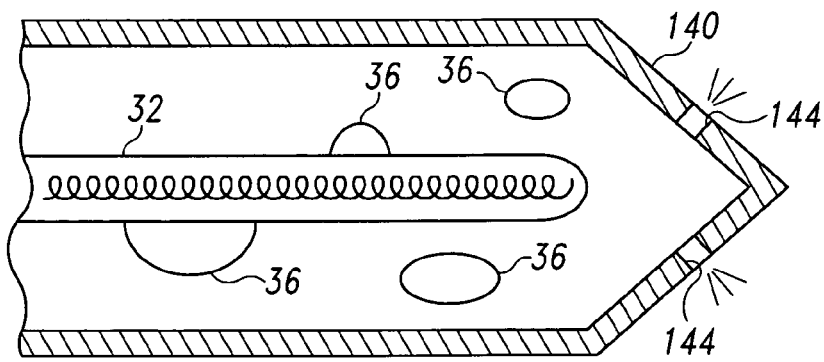
FIG. 4 is a sectional view showing the nozzle integrated into the housing of the heater.

Referring to FIG. 4, a heater 122 may be used in place of the heater 22 in FIG. 1. In such a case, the heater 122 is located in the passageway 42 and includes one or more heating elements 32 mounted in a nozzle 140 which serves as a housing of the heater 122. The heating element(s) vaporize(s) the liquid agent into bubbles. The bubbles provide sufficient vapor and injection force to atomize and inject the liquid agent through flow apertures 144 formed in the nozzle 140 into the passageway 42.

Referring back to FIG. 1, as alluded to above, the emission abatement device 18 may be configured in a variety of ways. For example, the emission abatement device may be configured as a NOx trap, an SCR device, and/or a particulate abatement device.

In the case where the emission abatement device 18 is a NOx trap, the agent is a regenerative agent such as hydrocarbon fuel (e.g., diesel fuel) for regenerating the NOx trap. To regenerate the NOx trap (i.e., reduce NOx trapped thereby into $N_2$ and other substances), the controller 26 operates the heater 22 from time to time (e.g., every 60 seconds) to vaporize into hydrocarbon fuel bubble(s) only a portion of liquid hydrocarbon fuel supplied by the agent supply 20. Such bubble generation atomizes the remaining non-vaporized liquid hydrocarbon fuel and provides the injection force for injecting the atomized liquid fuel into the exhaust gas stream. The bubble-injected fuel is then advanced to the NOx trap to regenerate the NOx trap.

In the case where the emission abatement device 18 is an SCR device, the agent is urea which the SCR device uses to reduce NOx present in the exhaust gas stream. The controller 26 operates the heater 22 to vaporize into urea bubble(s) only a portion of liquid urea supplied by the agent supply 20. Such bubble generation atomizes the remaining non-vaporized liquid urea and provides the injection force for injecting the atomized liquid urea into the exhaust stream. In this way, urea can be injected almost continuously at varying rates as needed to achieve continuous reduction of NOx.

In the case where the emission abatement device 18 is a particulate abatement device, the agent is a regenerative agent such as hydrocarbon fuel (e.g., diesel fuel) for regenerating a particulate filter of the particulate abatement device (e.g., a diesel particulate filter or "DPF"). To regenerate the particulate filter (i.e., burn particulate matter trapped thereby), the controller 26 operates the heater 22 from time to time to vaporize into hydrocarbon fuel bubble(s) only a portion of liquid hydrocarbon fuel supplied by the agent supply 20. Such bubble generation atomizes the remaining non-vaporized liquid hydrocarbon fuel and provides the injection force for injecting the atomized liquid fuel into the exhaust gas stream. The bubble-injected fuel is then advanced to the particulate abatement device where another component of the particulate abatement device oxidizes the fuel to create an exotherm that heats the particulate filter to burn particulate matter trapped thereby.

The additional component may take a variety of forms. For example, it may be an oxidation catalyst (e.g., diesel oxidation catalyst or "DOC") upstream from the particulate filter. In another implementation, it may be the NOx trap portion of an integrated Diesel Particulate-NOx Reduction device (i.e., a "DPNR device"). In yet another implementation, it may be a separate NOx trap upstream from the particulate filter.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The invention claimed is:

1. A method, comprising the steps of:
   vaporizing a first liquid portion of an agent into at least one bubble,
   injecting a second liquid portion of the agent into an exhaust gas stream by use of the at least one bubble, and
   advancing the bubble-injected agent to an emission abatement device.

2. The method of claim 1, wherein the vaporizing step comprises forming the at least one bubble with a heater.

3. The method of claim 1, wherein:
   the vaporizing step comprises vaporizing the first liquid portion of the agent into a plurality of bubbles, and
   the injecting step comprises injecting the second liquid portion of the agent into the exhaust gas stream by use of the plurality of bubbles.

4. The method of claim 3, wherein the injecting step comprises atomizing the second liquid portion of the agent by use of the plurality of bubbles.

5. The method of claim 1, wherein the injecting step comprises injecting the second liquid portion of the agent into the exhaust gas stream without introducing air into the agent.

6. The method of claim 1, wherein:
the vaporizing step comprises vaporizing a first liquid portion of a hydrocarbon fuel into a hydrocarbon fuel bubble,
the injecting step comprises injecting a second liquid portion of the hydrocarbon fuel into the exhaust gas stream by use of the hydrocarbon fuel bubble, and
the advancing step comprises advancing the bubble-injected hydrocarbon fuel to a NOx trap.

7. The method of claim 1, wherein:
the vaporizing step comprises vaporizing a first liquid portion of a hydrocarbon fuel into a hydrocarbon fuel bubble,
the injecting step comprises injecting a second liquid portion of the hydrocarbon fuel into the exhaust gas stream by use of the hydrocarbon fuel bubble, and
the advancing step comprises advancing the bubble-injected hydrocarbon fuel to a particulate abatement system.

8. The method of claim 1, wherein:
the vaporizing step comprises vaporizing a first liquid portion of urea into a urea bubble,
the injecting step comprises injecting a second liquid portion of the urea into the exhaust stream by use of the urea bubble, and
the advancing step comprises advancing the bubble-injected urea to a selective catalytic reduction device.

9. An apparatus, comprising:
an exhaust system comprising an emission abatement device, and
an injection system configured to vaporize a first liquid portion of an agent into at least one bubble so as to inject a second liquid portion of the agent into the exhaust system by use of the at least one bubble for delivery of the agent to the emission abatement device.

10. The apparatus of claim 9, wherein the injection system comprises a heater configured to vaporize the first liquid portion into the at least one bubble.

11. The apparatus of claim 10, wherein the heater comprises a single heating element configured to form the at least one bubble thereon.

12. The apparatus of claim 10, wherein:
the heater comprises a plurality of heating elements, and
each heating element is configured to form at least one bubble thereon.

13. The apparatus of claim 10, wherein the injection system comprises a controller electrically coupled to the heater to control operation of the heater.

14. The apparatus of claim 13, wherein the controller is configured to control operation of the heater according to a time-based scheme.

15. The apparatus of claim 13, wherein:
the injection system includes a sensor coupled to the controller and the exhaust system, and
the controller is configured to operate the heater in response to operation of the sensor.

16. The apparatus of claim 10, wherein:
the injection system comprises a nozzle for injecting the agent, and
the heater comprises a heating element positioned within the nozzle.

17. The apparatus of claim 10, wherein:
the injection system comprises a nozzle for injecting the agent, and
the heater comprises a heating element positioned outside of the nozzle.

18. The apparatus of claim 9, wherein the emission abatement device comprises a NOx trap fluidly coupled to the injection system to receive the bubble-injected agent.

19. The apparatus of claim 9, wherein the emission abatement device comprises a particulate abatement device fluidly coupled to the injection system to receive the bubble-injected agent.

20. The apparatus of claim 9, wherein the emission abatement device comprises a selective catalytic reduction device fluidly coupled to the injection system to receive the bubble-injected agent.

* * * * *